United States Patent
Gassert et al.

(10) Patent No.: US 11,980,963 B2
(45) Date of Patent: May 14, 2024

(54) ULTRASONIC WELDING DEVICE WITH POSITION DETECTION OF JOINT PARTNERS

(71) Applicant: SCHUNK SONOSYSTEMS GMBH, Wettenberg (DE)

(72) Inventors: Frank Gassert, Bischoffen (DE); Stefan Müller, Wetzlar (DE); Rainer Wagenbach, Merenberg (DE); Waldemar Werner, Reiskirchen (DE); Daniel Günther, Langgöns (DE); Dariusz Kosecki, Biebertal (DE); Stephan Becker, Marburg (DE); Eugen Koch, Grünberg (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 0 days.

(21) Appl. No.: 17/767,653

(22) PCT Filed: Nov. 5, 2019

(86) PCT No.: PCT/EP2019/080248
§ 371 (c)(1),
(2) Date: Apr. 8, 2022

(87) PCT Pub. No.: WO2021/089124
PCT Pub. Date: May 14, 2021

(65) Prior Publication Data
US 2024/0091874 A1    Mar. 21, 2024

(51) Int. Cl.
*B23K 20/00* (2006.01)
*B23K 20/10* (2006.01)
(Continued)

(52) U.S. Cl.
CPC ............ *B23K 20/10* (2013.01); *B23K 20/004* (2013.01); *B23K 20/26* (2013.01); *B23K 2101/38* (2018.08)

(58) Field of Classification Search
CPC .......... B23K 20/10–106; B23K 20/004; B23K 20/26; B23K 2101/38; B23K 1/06; B29C 65/08–088
USPC ..................... 228/1.1, 110.1; 156/73.1, 73.6, 156/580.1–580.2
See application file for complete search history.

(56) References Cited

U.S. PATENT DOCUMENTS

| | | | |
|---|---|---|---|
| 2007/0000890 A1* | 1/2007 | Steiner | B23K 11/0026 219/124.34 |
| 2018/0079027 A1 | 3/2018 | Gassert et al. | |
| 2020/0112134 A1 | 4/2020 | Schmidt et al. | |

FOREIGN PATENT DOCUMENTS

| | | | | |
|---|---|---|---|---|
| CN | 1871096 A | * | 11/2006 | ......... B23K 11/0026 |
| CN | 101001712 A | * | 7/2007 | ............. B23K 20/10 |

(Continued)

OTHER PUBLICATIONS

International Search Report (with English Translation) and Written Opinion (with Machine Translation) dated Sep. 9, 2020 in corresponding International Patent Application No. PCT/EP2019/080248; 14 pages.

*Primary Examiner* — Kiley S Stoner
(74) *Attorney, Agent, or Firm* — Maier & Maier, PLLC (57) ABSTRACT

An ultrasonic welding device includes a sonotrode, an anvil, a touching element, a lateral slide, a stop element and a receiving chamber in which joining partners are received and which is defined by bordering components of the ultrasonic welding device. The receiving chamber is defined on a first side by the sonotrode and on a second side by the anvil. The receiving chamber is further defined on a third side by the touching element and on a fourth side by the lateral slide. The receiving chamber is further defined on a (Continued)

fifth side, extending transverse to the first to fourth sides, by the stop element. The first stop element is electrically conductive on its surface directed toward the receiving chamber in order to form a first electrode.

13 Claims, 3 Drawing Sheets (51) Int. Cl.
*B23K 20/26* (2006.01)
*B23K 101/38* (2006.01)

(56) References Cited

FOREIGN PATENT DOCUMENTS

| | | | | |
|---|---|---|---|---|
| CN | 105339124 A | * | 2/2016 | ............ B23K 20/10 |
| DE | 10350809 B3 | * | 7/2005 | ............ B23K 20/10 |
| DE | 10359368 A1 | * | 7/2005 | ............ B23K 20/10 |
| DE | 102013107637 A1 | * | 1/2015 | ............ B23K 20/10 |
| DE | 102014013452 A1 | * | 3/2016 | ............ B23D 15/08 |
| DE | 102015206866 B3 | | 7/2016 | |
| DE | 102015222011 A1 | * | 5/2017 | ........... B23K 20/004 |
| DE | 102016214227 B3 | * | 12/2017 | ............ B23K 20/10 |
| DE | 102017006239 A1 | | 6/2018 | |
| DE | 102017106539 B3 | * | 8/2018 | |
| DE | 102017114182 B3 | | 9/2018 | |
| EP | 0196584 A1 | * | 10/1986 | |
| EP | 0701876 A1 | * | 3/1996 | |
| EP | 1516689 A1 | | 3/2005 | |
| EP | 1516689 A1 | * | 3/2005 | .............. B06B 3/02 |
| EP | 2786835 A1 | * | 10/2014 | ........... B23K 20/106 |
| SE | 1650347 A1 | * | 9/2017 | |
| WO | WO-2005042202 A1 | * | 5/2005 | ............ B23K 20/10 |
| WO | WO-2005116593 A1 | * | 12/2005 | ........... B06B 1/0618 |
| WO | WO-2006005509 A1 | * | 1/2006 | ........... B23K 20/004 |
| WO | WO-2010026173 A1 | * | 3/2010 | ......... B23K 11/0026 |
| WO | WO-2018024460 A1 | * | 2/2018 | |
| WO | WO-2019076433 A1 | * | 4/2019 | ........... B23K 20/106 |

\* cited by examiner

ULTRASONIC WELDING DEVICE WITH POSITION DETECTION OF JOINT PARTNERS

FIELD

The present invention relates to an ultrasonic welding device.

BACKGROUND

For a wide variety of technical applications, it may be necessary to join two components together in a mechanically secure and/or electrically conductive manner. For example, it may be necessary for various purposes to join cables or their strands together mechanically and in an electrically conductive manner. This may be used, for example, to produce wiring harnesses or cable looms with the aid of which electrical consumers, inside a vehicle for example, may be electrically connected to each other, to an energy source and/or to a control system.

So-called ultrasonic welding was developed to produce substance-to-substance bonds between two electrically conductive components, providing them with high strength and good electrical conductivity. It is a special form of friction welding in which components to be welded, also referred to as joining partners or weld material, are brought into surface contact with each other and moved against each other under low pressure and high-frequency mechanical vibrations. In this case, the vibrations may be generated with the aid of a sonotrode in which ultrasonic vibrations with frequencies of typically 20 kHz to 50 kHz are generated and transmitted to at least one of the joining partners. Plastic flow then allows the joining partners to permeate or interlock with each other close to the surface without the materials of the joining partners necessarily melting. Ultrasonic welding may therefore be used to bond joining partners together with low impact, quickly and economically.

Ultrasonic welding may also be used in particular for welding metal joining partners, such as strands of two or more cables to be joined, for example, or two or more individual wires of a strand of a cable to be welded together, for example. For this purpose, the joining partners are generally inserted into a receiving chamber of an ultrasonic welding device and then welded together between an ultrasonically vibrating sonotrode and an anvil.

In ultrasonic welding, the positioning of the joining partners relative to each other during an ultrasonic welding process may have a significant impact on the quality of the weld produced. In particular, the ends of one, two or more strands to be welded as joining partners should be positioned on top of each other as accurately as possible in the receiving chamber of the ultrasonic welding device so that they are received approximately in alignment with each other between the sonotrode and the anvil and may be welded together.

Traditionally, an operator of an ultrasonic welding device often had to take care to correctly position cables to be welded with their strands inside the receiving chamber of the ultrasonic welding device. For this purpose, markings could be provided inside the receiving chamber against which the ends of the strands were to be aligned.

To weld cables together in the form of a so-called end splice, i.e. when both cables were to be inserted into the receiving chamber of the ultrasonic welding device coming from the same direction, it was also known to manually screw a stop element in the form of a so-called strand end stop to a mounting plate and then to mount this mounting plate at a suitable position in the ultrasonic welding device. The strands of the cables could then be positioned in the receiving chamber with their front faces abutting the stop element. However, installing such stop elements was complex and they had to be removed again when not in use.

SUMMARY

There may be a requirement for an ultrasonic welding device for welding two or more joining partners which is easy to operate, which facilitates a high and preferably consistent quality of the welded joints produced over many welding operations and/or which may be configured in a simple manner for various purposes, in particular for producing different types of weld splices.

Such a requirement may be met by the subject matter of the independent claim. Advantageous embodiments are defined in the dependent claims and the following description.

According to one aspect of the present invention, an ultrasonic welding device is described which is equipped with a functionality for detecting a desired positioning of joining partners to be welded inside the ultrasonic welding device. The ultrasonic welding device comprises as components at least a sonotrode, an anvil, a touching element, a lateral slide, a receiving chamber, in which joining partners are to be received and which is defined by bordering components of the ultrasonic welding device, and a stop element. The stop element is referred to herein as the first stop element since, as explained below, at least one additional stop element may optionally be provided. The receiving chamber is defined on a first side by a surface of the sonotrode and on a second side opposing the first side by a surface of the anvil. The receiving chamber is further defined on a third side by a surface of the touching element and on a fourth side opposing the third side by a surface of the lateral slide. The receiving chamber, at least in a positioning configuration which may be assumed by the first stop element, is further defined on a fifth side, extending transverse to the first to fourth sides, by a surface of the first stop element directed toward the receiving chamber. The first stop element is electrically conductive on its surface directed toward the receiving chamber in order to form a first electrode. At least one of the bordering components defining the receiving chamber, including the sonotrode, the anvil, the touching element and the lateral slide, is electrically conductive on its surface directed in each case toward the receiving chamber in order to form a second electrode. The ultrasonic welding device is configured to detect an electrical closure between the first electrode and the second electrode and, based thereon, to detect the desired positioning of at least one of the joining partners to be welded.

Without limiting the scope of the invention in any way, ideas and possible features relating to embodiments of the invention may be considered to be based, inter alia, on the thoughts and findings described below.

The joining partners to be welded are to be received in the receiving chamber of the ultrasonic welding device before and during the welding process. The receiving chamber is typically defined from at least four sides such that the joining partners may only be accommodated in a limited volume. On two opposing sides, i.e. on the top and bottom for example, the receiving chamber may be defined on the one hand by a surface of the sonotrode and on the other hand by a surface of the anvil. The sonotrode and/or the anvil may be displaceable such that these two components may be moved in relation to each other, toward or away from each other, and in this way the receiving chamber may be made smaller or larger in a first direction, i.e. in the vertical direction for example. On two further opposing sides, which extend transverse, preferably perpendicular, to the previously mentioned two sides, i.e. on the left and right for example, the receiving chamber may be defined on the one hand by a surface of the touching element and on the other hand by a surface of the lateral slide. The touching element and/or the lateral slide may again be displaceable such that these two components may be moved in relation to each other, toward or away from each other, and in this way the receiving chamber may be made smaller or larger in a second direction extending perpendicular to the above-mentioned first direction. In this case, the surfaces of said components may surround the receiving chamber like a frame, in particular a quadrangular frame. On the fifth or sixth side which is not defined by said components, the joining partners may be inserted or pushed into the receiving chamber surrounded in a frame-like manner.

The formulation "defining the receiving chamber on one side" may be understood to the effect that the respective surface of the component mentioned in each case results in the joining partners being unable to move beyond the boundary produced by this surface. For this purpose, the respective surface may completely cover the receiving chamber on the respective side. Alternatively, however, only partial covering of the receiving chamber on the respective side may also be sufficient, as long as it remains ensured that the joining partners are held within the receiving chamber.

The two respectively opposing components, i.e. the sonotrode and the anvil or the touching element and the lateral slide, may preferably be moved relative to each other, in particular toward each other, in such a manner as to be able to temporarily reduce a volume of the receiving chamber and, in particular, to be able to press the joining partners received therein into contact with each other.

By providing the joining partners with only a relatively small receiving chamber, which is surrounded in a frame-like manner by the mentioned four components transverse to a direction in which the mostly elongate joining partners are pushed or inserted into the receiving chamber, it may be achieved that the joining partners may or must already be arranged in the receiving chamber with at least roughly predetermined positioning in relation to each other before the actual welding operation begins, i.e. before the joining partners are pressed together between the sonotrode and the anvil. For example, it may be achieved that strands of two cables serving as joining partners and stripped at their ends are arranged in the receiving chamber in such a manner that they are pressed tightly into contact with each other when the sonotrode and anvil are brought together.

If the ultrasonic welding device is configured in such a manner that the sonotrode and the anvil define the receiving volume from above and below, this means that the two cable ends are advantageously arranged vertically on top of each other. Such an arrangement typically has a positive effect on a welding result, whereas strands arranged side by side would frequently be welded only insufficiently.

The ultrasonic welding device described here is also to have a first stop element, with the aid of which a fifth side of the receiving chamber may also be defined. This fifth side extends transverse, preferably perpendicular, to the other four sides described above which are defined in a frame-like manner by other components. On the fifth side, the first stop element may thus close a passage through the receiving chamber, which is defined in a frame-like manner, such as would otherwise occur between the fifth and the opposing sixth side.

Accordingly, although one or more joining partners may be inserted into the receiving chamber on the sixth side, they may no longer leave the receiving chamber on the fifth side or protrude beyond the receiving chamber on the fifth side. Instead, the front face of elongate joining partners may merely reach up to a surface of the stop element directed toward the receiving chamber and come into contact therewith.

Thus, one or more joining partners to be welded may each be inserted into the receiving chamber and pushed with their front face up to the stop element such that their front face ends are aligned abutting on the stop element or such that, in the case of a plurality of joining partners, their front face ends are positioned on top of and in alignment with each other and/or next to each other. The joining partners may be inserted by a user operating the ultrasonic welding device or by another machine.

Provision of the stop element on the fifth side of the receiving chamber makes it very easy to insert the joining partners into the receiving chamber in a configuration in which they are aligned relative to each other. For example, a person may push cables coming from the sixth side into the receiving chamber until they feel that the cables are abutting on the stop element arranged opposite. In principle, an operator of the ultrasonic welding device may thus detect haptically, i.e. feel, whether a cable has been correctly inserted into the receiving chamber. Accordingly, there is not generally any need to visually check the positioning of the cables.

However, during the practical use of ultrasonic welding devices, it was repeatedly observed that operators of the ultrasonic welding device, for example due to a distraction or lack of concentration, did not arrange joining partners in a desired positioning within the receiving chamber of the ultrasonic welding device before a welding operation was initiated. Accordingly, in some cases at least, the joining partners could be welded with insufficient quality which could lead, for example, to variations in the electrical conductivity achieved by the splice produced and/or to variations in a mechanical strength of the splice.

Therefore a way of supporting the operator to correctly position the joining partners to be welded was sought by means of an additional functionality implemented in the ultrasonic welding device.

To make this possible, it is proposed to configure a surface of the first stop element directed toward the receiving chamber as a first electrode that is electrically conductive and to configure a surface directed toward the receiving chamber of at least one of the components laterally surrounding the receiving chamber as the second electrode that is also electrically conductive. Furthermore, the ultrasonic welding device should be adapted to be able to identify when an electrical closure occurs between these two electrodes, i.e. when the two electrodes are connected to each other by an electrically conductive element. The electrical closure may be understood here as an electrical connection between the first and the second electrode, as may be established by an electrically conductive element such as a cable, for example, with relatively low electrical resistance compared to an air gap between the two electrodes. The ultrasonic welding device should be able to interpret the electrical closure to the effect that the joining partner inserted into the receiving chamber has been arranged in the desired positioning.

This is based on the consideration that cables to be welded are generally stripped at their ends beforehand so that their electrically conductive strands are exposed. The cables are then inserted with these exposed strands into the receiving chamber of the ultrasonic welding device. A configuration of the receiving chamber and the components laterally defining it may be selected in such a manner that the cables are then arranged in a desired positioning when they, on the one hand, abut with their front face on the surface of the stop element forming the first electrode and, on the other hand, abut laterally on the surface, forming the second electrode, of one of the components surrounding the receiving chamber. In such a positioning, the exposed strands connect the first electrode electrically to the second electrode. Thus, if an electrical closure has been created in this manner between the two electrodes, this may be considered as a detection feature that the cables have been positioned correctly.

According to one embodiment, an electrical insulation is arranged between the surface of the stop element directed toward the receiving chamber and the surface of the at least one of the bordering components defining the receiving chamber.

In other words, the surface of the stop element which forms the first electrode is electrically insulated from the surface of the component which forms the second electrode by an intermediate electrical insulator for at least as long as any element that is not part of the ultrasonic welding device, such as a cable inserted into the receiving chamber, does not mutually close the circuit between these two surfaces.

In this case, the electrical insulation may be achieved by spatially distancing the surfaces forming the two electrodes and/or by an insulating element, made of an electrically insulating material, located between these surfaces or the components bearing them.

In principle, the second electrode may be formed by a surface directed toward the receiving chamber of any one of the components defining the receiving chamber, i.e. a surface of the sonotrode, the anvil, the touching element or the lateral slide. When a cable contacts both the second electrode formed by this surface and the first electrode formed on the first contact element, detection of the electrical closure caused by this ensures that the cable reaches up to the stop element with its face end and is thus positioned in the receiving chamber in a desired manner in the direction of insertion.

However, it is not possible in all cases to detect where the cable is located within the receiving chamber transverse to the direction of location. For example, if the second electrode is formed by a horizontally extending surface of the sonotrode defining the receiving chamber at the bottom, a cable may contact the sonotrode in different positions, i.e. for example, at its center or on one of its lateral edges, provided that the receiving chamber is wide enough.

According to one embodiment, the surface forming the second electrode may extend laterally adjacent to the receiving chamber.

Expressed differently, the surface which forms the second electrode may abut on the receiving chamber laterally, i.e. it may be adjacent to the receiving chamber when viewed in a horizontal direction. In other words, the second electrode may be formed not by a surface defining the receiving chamber at the bottom or top but by a surface defining the receiving chamber on the left or right.

In this way, it may be achieved that a cable inserted into the receiving chamber must be abutted on the outermost lateral edge of the receiving chamber in order to come into contact there with the surface forming the second electrode and be able to produce the electrical closure with the first electrode. Only in the case of such a positioning does the ultrasonic welding device detect, due to the electrical closure produced, that the cable as a joining partner has been arranged in a desired positioning. This ensures that the cable, when the ultrasonic welding device has detected it as correctly positioned, rests with both its front face on the first stop element and with its circumferential surface on the surface laterally defining the receiving chamber. A positioning of joining partners may thus be reproducibly checked in two directions, i.e. in both the direction of insertion into the receiving chamber and transversely horizontal to this direction of insertion.

According to one embodiment, the surface forming the second electrode may extend vertically.

In principle, the surface forming the second electrode may also extend at other angles to the horizontal, i.e. obliquely to the horizontal. However, a vertical orientation of the surface forming the second electrode may be advantageous, as a joining partner inserted into the receiving chamber may then be abutted on this surface with particular ease.

In particular, according to one embodiment, the touching element may be arranged laterally adjacent to the receiving chamber and stationary relative to the receiving chamber in the horizontal direction, and the surface forming the second electrode may be the surface of the touching element directed toward the receiving chamber.

The touching element is usually arranged in the welding unit in a plane laterally defining the receiving chamber. The touching element may be stationary or, for example, may be moved together with the anvil in said plane. As such, the touching element is particularly suitable as a stop on which a joining partner may be laterally abutted in order to position it in the receiving chamber in the desired manner.

According to one embodiment, the first stop element is displaceable between a pulled-in position and a pulled-out position. In this case, in the pulled-in position the first stop element defines the receiving chamber on the fifth side and in the pulled-out position leaves the receiving chamber open on the fifth side.

It was realized that the stop element defining the fifth side may be obstructive or undesirable in certain cases. For example, it may be desirable to be able to use the ultrasonic welding device also for welding so-called inline splices. The cables welded together in a configuration as an inline splice form an extension of an electric wire, whereas the configuration as an end splice may be considered as a kind of return of the electric wire. To create an inline splice by ultrasonic welding, cables are inserted into the receiving chamber from opposing sides. Accordingly, the mutually opposing fifth and sixth sides of the receiving chamber should at least not permanently be defined by a stop element for this application purpose.

It is therefore proposed to provide the first stop element as an integrated component of the ultrasonic welding device, i.e. the first stop element is permanently connected to and interacts with other components of the ultrasonic welding device. However, the first stop element should preferably not be fixed in a stationary position in the ultrasonic welding device but rather it is proposed to configure the first stop element in such a manner that it may be moved between a first, so-called pulled-in position and a second, so-called pulled-out position. In the pulled-in position, the first stop element defines the receiving chamber on its fifth side. Accordingly, in this configuration it may serve as a mechanical stop for one or more joining partners which are inserted into the receiving chamber from the sixth side. In the pulled-out position, however, the stop element uncovers the fifth side at least to such an extent that one or more joining partners may also be inserted into the receiving chamber from the fifth side. Expressed differently, the stop element of the ultrasonic welding device described herein may preferably be selectively pulled in or pulled out depending, for example, on whether an end splice or an inline splice is to be welded. The pulled-in position and the pulled-out position may be several millimeters to a few centimeters, for example between 2 mm and 10 cm, preferably between 4 mm and 4 cm, apart from each other.

According to one embodiment, the ultrasonic welding device further comprises a drive device which is configured to actively displace the first stop element between the pulled-in position and the pulled-out position.

In other words, the ultrasonic welding device is preferably not to have only a first stop element which is to be moved merely passively and which, for example, is displaced between the pulled-in and the pulled-out position by a person operating the ultrasonic welding device. Instead, the ultrasonic welding device is to have a drive device which may actively displace the first stop element from the pulled-in position to the pulled-out position and/or vice versa. Displacement of the first stop element may be automated by means of such a drive device. The drive device may be connected to a power supply. Furthermore, the drive device may be connected to a control system or have an integrated control system with which its operation may be controlled.

Details of the possible displaceability of the stop element as well as of the drive device which may be used for its displacement are described in a patent application which will be filed by the applicant of the present application on the same day as the present application and bears the title "Ultrasonic welding device with displaceable stop element". This parallel patent application also describes possible embodiments of the drive device, a joining partner detection device, a human-machine interface, a sensor system for detecting an actual position of the displaceable stop element and a guide for guiding the first stop element. The contents of this parallel patent application are to be fully incorporated by reference into the present patent application.

According to a further developed embodiment, the ultrasonic welding device may further comprise a second stop element. The receiving chamber, at least in a positioning configuration which may be assumed by the second stop element, is further defined on a sixth side, opposing the fifth side, by a surface of the second stop element directed toward the receiving chamber. The second stop element is electrically conductive on its surface directed toward the receiving chamber in order to form a third electrode. In this case, the ultrasonic welding device is additionally configured to detect an electrical closure between the third electrode and the second electrode and, based thereon, to detect the desired positioning of at least one of the joining partners to be welded. The second stop element may thus be arranged on the opposite side to the first stop element so that the two stop elements define the receiving chamber between them. In this case, the first stop element may be used to position joining partners inserted into the receiving chamber from the sixth side such that they abut on the first stop element and thus reach directly to the edge of the receiving chamber there but do not protrude beyond it. In contrast, the second stop element may be used to perform a similar task for joining partners inserted from the opposing fifth side, i.e. to position them by laying their front faces against the second stop element in such a manner that they reach up to the opposing edge of the receiving chamber but do not protrude beyond it.

By means of the two stop elements, joining partners may thus be received in the receiving chamber one after the other from both opposing sides and be suitably positioned therein in order to form a high-quality inline splice after the ultrasonic welding process.

Analogously with regard to the first stop element described above, the ultrasonic welding device should be configured in this case to be able to detect an electrical closure between the third electrode formed by the second stop element and the second electrode which is formed by one of the components laterally defining the receiving chamber. If such an electrical closure is detected, the ultrasonic welding device may identify on this basis that a joining partner has been positioned in a desired position adjacent to the second stop element as well as abutting on the lateral component forming the second electrode.

According to one embodiment, the second stop element may also be displaceable between a pulled-in position and a pulled-out position, where in the pulled-in position the second stop element defines the receiving chamber at least in certain areas on a sixth side and in the pulled-out position leaves the receiving chamber open on the sixth side.

Expressed differently, the second stop element, similarly to the first stop element, may be displaceable between a pulled-in position and a pulled-out position. Accordingly, while the first stop element is arranged in its pulled-in position, the second stop element may be displaced into its pulled-out position such that the sixth side of the receiving chamber is open and one or more joining partners may be pushed into the receiving chamber from that side until they abut on the first stop element. Then the first stop element may be displaced into its pulled-out position and the second stop element may be brought into its pulled-in position. In this configuration, the fifth side of the receiving chamber is then open such that one or more joining partners coming therefrom, may be pushed into the receiving chamber until they abut on the second stop element. The first and second stop elements may be displaced independently of each other or in dependence on each other. They may further be displaced in a fully or partially automated manner.

According to a detailed embodiment, in this case the second stop element may comprise a plurality of elongate segments which each extend in a direction along the sixth side and parallel to each other. Each of the segments may be displaceable between the pulled-in position and the pulled-out position independently of adjacent segments.

In other words, the second stop element may preferably be in multi-part form. A boundary of the receiving chamber formed on its sixth side by the second stop element may be composed in this case of a plurality of segments. Each individual segment may be elongate and extend along or in extension of the sixth side or parallel thereto. In this case, the various segments may extend parallel to each other and thus, when they are displaced into their pulled-in position, may cover at least certain regions of the sixth side of the receiving chamber with their surfaces.

The segments may be displaced independently of each other between the pulled-in position and the pulled-out position. Expressed differently, each of the segments may be displaced in the direction of its longitudinal extension independently of adjacent segments. Accordingly, some of the segments may remain in their pulled-out position, for example, while others of the segments are displaced into their pulled-in position or into an intermediate position.

This segment-like structure of the second stop element may have the effect that the boundary to be implemented thereby on the sixth side of the receiving chamber may, if necessary, cover not the entire sixth side but only parts thereof. This may be advantageous if, for example, joining partners coming from the sixth side have previously been positioned in the receiving chamber such that the receiving chamber may no longer be completely closed on its sixth side. In this case, those segments which would cover a partial region of the sixth side, from which the joining partners already inserted extend outward, may remain in their pulled-out position, whereas the other segments may cover an adjacent partial region of the sixth side by being displaced into their pulled-in position. The segments displaced into the pulled-in position may then form a physical stop for joining partners inserted from the opposing fifth side.

The ultrasonic welding device may further comprise a drive device for propelling the second stop segment as well as other details as described in the patent application already mentioned above and filed in parallel by the applicant.

According to one embodiment, the ultrasonic welding device is configured to emit a signal perceptible to an operator of the ultrasonic welding device on detecting an electrical closure between the first electrode and the second electrode.

In other words, the ultrasonic welding device may comprise a monitoring device between the components forming the first and second electrode which checks permanently or at certain time intervals whether an electrical connection exists between the first and second electrodes. For this purpose, an electrical voltage may be applied between the electrodes, for example, and it may be monitored whether an electric current flows in response. If an electrical closure is detected in this manner, the ultrasonic welding device may emit a signal which an operator may perceive visually, acoustically, haptically or in some other way. For this purpose, the ultrasonic welding device may have, for example, a small lamp, an LED, a visual display, a speaker, a beeper or the like. When the operator perceives the signal, he recognizes, for example, that the cable he has inserted into the receiving chamber has been positioned correctly.

According to one embodiment, the ultrasonic welding device may additionally or alternatively be configured to enable execution of a welding operation exclusively on detecting an electrical closure between the first electrode and the second electrode.

Expressed differently, the ultrasonic welding device may allow a welding operation to be performed only if the electrical closure between the two electrodes has been detected beforehand and it may thus be assumed that welding partners have been correctly positioned in the receiving chamber. For this purpose, the two electrodes may be part of a safety circuit, for example, which must be electrically closed before the ultrasonic welding device may start a welding operation.

According to one embodiment, the ultrasonic welding device may additionally or alternatively be configured to automatically initiate execution of a welding operation on detecting an electrical closure between the first electrode and the second electrode.

In this case, for example, the ultrasonic welding device may dispense with the need for an operator to initiate a welding operation manually, for example by pressing a start button. Instead, the ultrasonic welding device may wait until the electrical closure between the two electrodes is detected and then assume that the joining partners to be welded have been correctly arranged in the receiving chamber and thereupon initiate the welding operation. If necessary, additional safety measures must be taken to prevent the automated ultrasonic welding device from endangering the operator.

It should be noted that possible features and advantages of embodiments of the invention are explained herein partly with reference to an ultrasonic welding device configured according to the invention and partly with reference to a manner of operating or using the same. A person skilled in the art will recognize that the features described for individual embodiments may be suitably transferred to other embodiments in an analogous manner, may be adapted and/or interchanged to arrive at further embodiments of the invention and possibly synergistic effects.

BRIEF DESCRIPTION OF THE DRAWINGS

Advantageous embodiments of the invention are further explained below with reference to the accompanying drawings, and neither the drawings nor the explanations are to be construed as limiting the invention in any way.

The figures are merely schematic and not to scale. Identical reference numerals in the various drawings denote identical features or features having the same effect.

DETAILED DESCRIPTION

Figure 1:
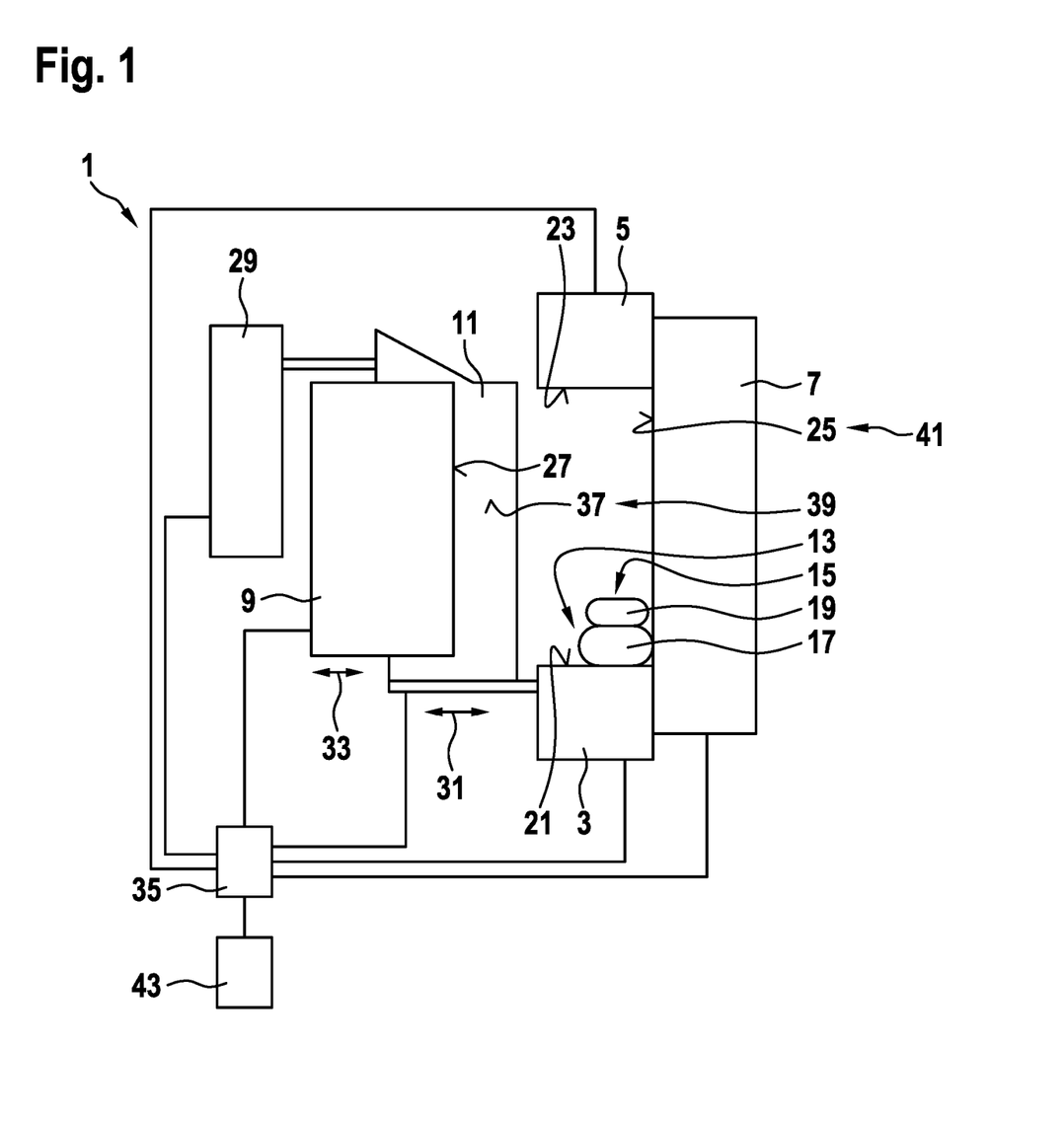
FIG. 1 shows a greatly simplified lateral view of an ultrasonic welding device according to an embodiment of the present invention.

FIG. 1 shows a greatly simplified view of an ultrasonic welding device 1 according to an embodiment of the present invention. The ultrasonic welding device 1 is also shown in two different configurations in FIG. 2 and FIG. 3 in a specific embodiment in perspective view and with somewhat more detail regarding some main components.

The ultrasonic welding device 1 comprises a sonotrode 3, an anvil 5, a touching element 7 and a lateral slide 9. Said components surround in a frame-like manner a receiving chamber 13 in which joining partners 15, such as a first strand 17 of a first cable and second strand 19 of a second cable, may be received. A first side (at the bottom in the example shown) of the receiving chamber 13 is defined in this case by a surface 21 of the sonotrode 3. A second side (at the top in the example shown) opposing the first side of the receiving chamber 13 is defined by a surface 23 of the anvil 5. A third side (on the right in the example shown) of the receiving chamber 13 is defined by a surface 25 of the touching element 7. And a fourth side (on the left in the example shown) opposing the third side of the receiving chamber 13 is defined by a surface 27 of the lateral slide 9. In the example shown, the surfaces 21 and 23 of the sonotrode 3 and the anvil 5 each extend horizontally and parallel to each other, whereas the surfaces 25 and 27 of the touching element 7 and the lateral slide 9 each extend vertically and again parallel to each other. The receiving chamber 13 defined by said surfaces 21, 23, 25, 27 is thus approximately cuboid.

Figure 2:
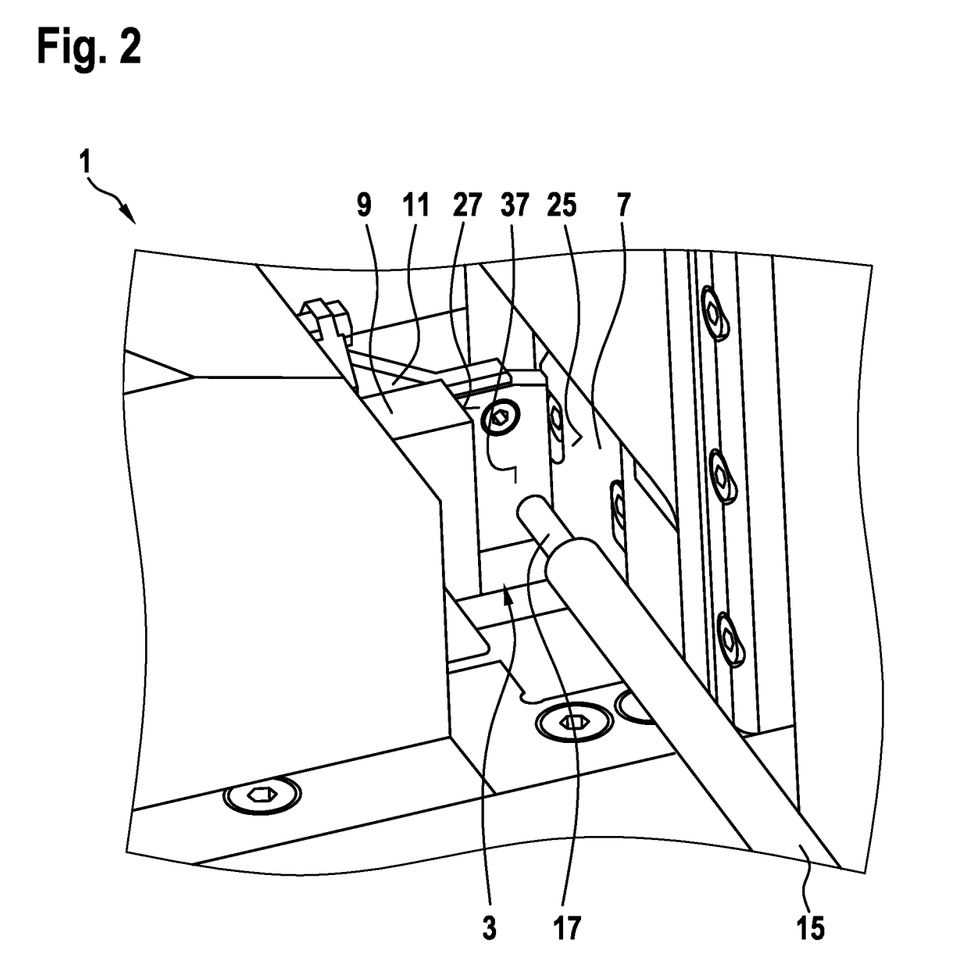
FIG. 2 shows a perspective view of an ultrasonic welding device according to an embodiment of the present invention in a first configuration with a first stop element in its pulled-in position.
Figure 3:
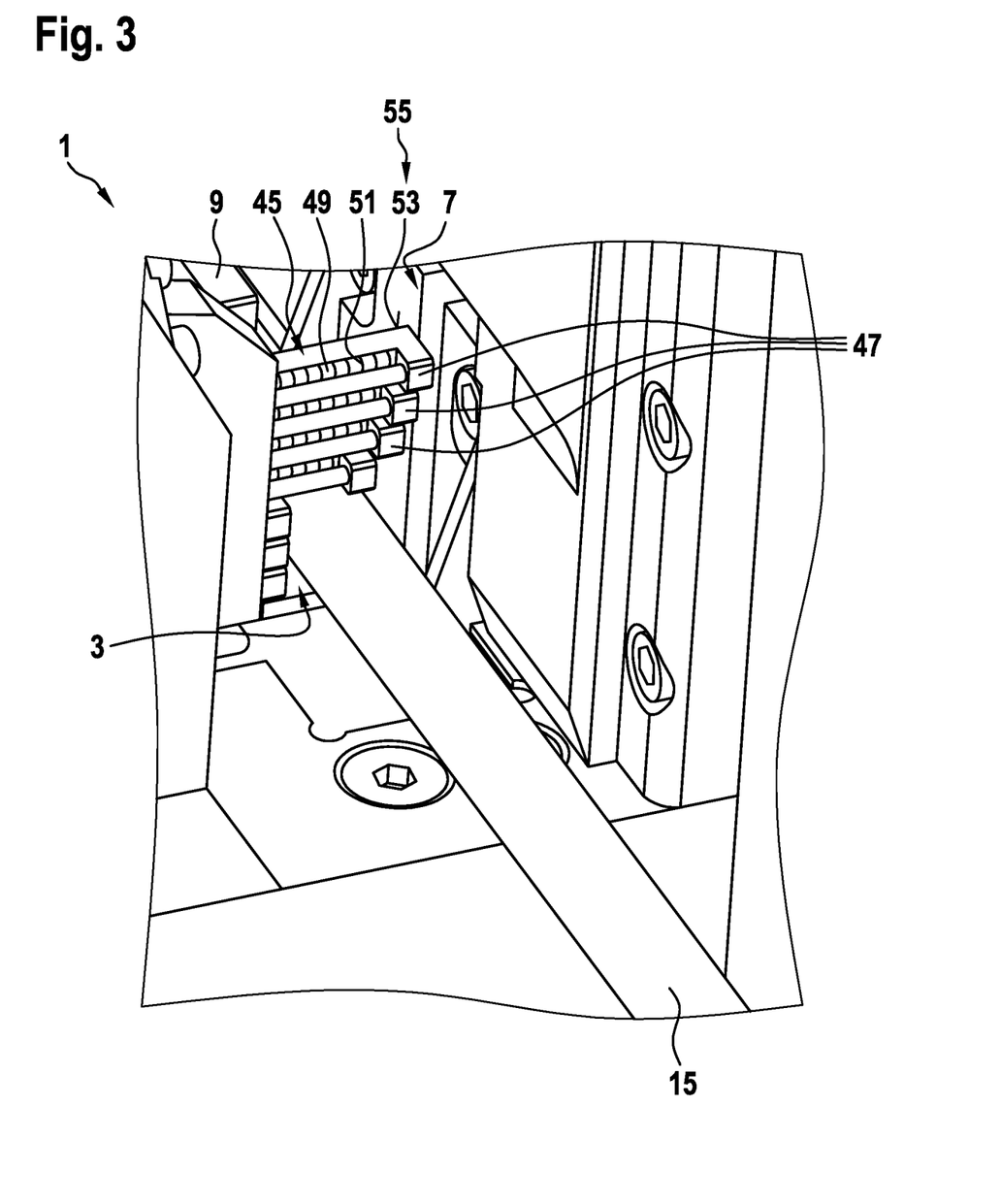
FIG. 3 shows a perspective view of an ultrasonic welding device according to an embodiment of the present invention in a second configuration with a second stop element in its pulled-in position.

As may easily be seen in particular in the perspective views of FIGS. 2 and 3, a first stop element 11 is provided behind the lateral slide 9. This first stop element 11 may be arranged, as shown in FIG. 2, in a pulled-in position in which it defines the receiving chamber 13 on a fifth side (at the back in the example shown). If necessary, the first stop element 11 may be displaced into a pulled-out position in which it leaves the receiving chamber 13 open on the fifth side.

For reasons of clarity, FIGS. 2 and 3 show only a few of the main components of the ultrasonic welding device but some of the optional components explained below are only schematically illustrated in FIG. 1 and are omitted in FIGS. 2 and 3.

The first stop element 11 may be displaced along a displacement direction 31 between the pulled-in position and the pulled-out position by means of a drive device 29. For this purpose, the drive device 29 may be controlled by a control system 35. The control system 35 may be a separate component or may be integrated in the drive device 29.

Furthermore, the control system 35 may also control displacement movements of the displaceable anvil 5 and/or of the displaceable lateral slide 9. In addition, the control system 35 may control operation of the sonotrode 3.

To be able to detect, for example, whether an operator of the ultrasonic welding device 1 has arranged the two strands 17, 19 acting as joining partners 15 in a position within the receiving chamber 13 that is considered advantageous for this purpose, the ultrasonic welding device 1 is equipped with a functionality by means of which such a positioning may be detected.

For this purpose, in the example shown, at least the surface 37 of the first stop element 11 directed toward the receiving chamber 13 is electrically conductive and thus acts as the first electrode 39. In addition, in the example shown, the surface 25 of the touching element 7 directed toward the receiving chamber 13 is electrically conductive and thus acts as the second electrode 41. In this case, the two electrodes 39, 41 formed in this manner in the ultrasonic welding device 1 are arranged or are separated from each other by electrically insulating materials or components in such a way that no electrical connection exists between them through components of the ultrasonic welding device 1 itself.

In this case, the ultrasonic welding device 1 is configured to detect an electrical closure between these two electrodes 39, 41. To this end, for example, the control system 35 may be electrically connected to the components forming the electrodes 39, 41 and detect when an electrical path between these two components closes.

Such an electrical closure may be produced, as shown in FIG. 2, by the stripped strand 17 of a cable serving as joining partner 15. When the cable is arranged in a preferred position for this inside the receiving chamber 13, on the one hand, the strand 17 on its front face contacts the first electrode 39 in the form of the surface 37 of the stop 11 directed toward the receiving chamber 13 and, on the other hand, contacts the second electrode 41 in the form of the surface 25 of the touching element 7 directed toward the receiving chamber 13.

Due to the electrical closure caused by this, the control system 35, for example, may control a signal generating device 43 to emit a signal perceptible to the operator of the ultrasonic welding device 1. Alternatively or additionally, it may be provided that the control system 35 allows a welding operation to be performed exclusively if said electrical closure between the two electrodes 39, 41 is detected and thus desired positioning of the joining partners 15 may be assumed. It may even be possible to initiate a welding operation automatically as a result.

FIG. 3 illustrates a configuration of the ultrasonic welding device 1 in which a second stop element 45 has been displaced at least in certain regions into its pulled-in position. The second stop element 45 extends adjacent to the receiving chamber 13 on the sixth side opposing the fifth side. Thus, the second stop element 45 may serve as a mechanical stop for joining partners 15 which have been inserted into the receiving chamber 13 from the fifth side.

The second stop element 45 is not configured as a simple one-piece plate like the first stop element 11 but has a plurality of elongate segments 47. The segments 47 may be displaced into the pulled-in and/or the pulled-out position independently of each other. For this purpose, each of the segments 47 is coupled to a segment-moving element 49 which may be displaced by a drive device (not shown). However, the segment-moving element 49 does not transmit a movement of the drive device rigidly to the associated segment 47. Instead, the segment 47 is coupled to the segment-moving element 49 via a spring 51. In this way, it may be achieved that the respective segment 47, when it is force-actuated by its segment-moving element 49 toward the pulled-in position, is elastically biased toward the pulled-in position but in fact does not necessarily move toward the pulled-in position. Instead, segments 47 which encounter an obstacle, such as joining partners 15 arranged in the receiving chamber 13, during a movement toward the pulled-in position may be stopped by this obstacle. These segments 47 then press against the obstacle in an elastically biased manner. This may be used to temporarily secure joining partners 15 already arranged in the receiving chamber 13. This is illustrated in FIG. 3 for the lower three segments 47. Those segments 47 which do not encounter an obstacle are displaced toward the pulled-in position. There they then form a boundary of the receiving chamber 13, on which joining partners inserted from the opposite side may abut mechanically and thus be aligned. This is illustrated in FIG. 3 for the upper four segments 47.

The second stop element 45 is again electrically conductive on its surface 53 directed toward the receiving chamber 13 in order to form a third electrode 55 in this manner. The ultrasonic welding device 1 or its control system 35 is configured in this case to also detect an electrical closure between this third electrode 55 and the second electrode 41 on the touching element 7.

In this way, it may also be detected for strands of cables that are to be inserted into the receiving chamber 13 from the rear sixth side whether they have been positioned in a desired manner adjacent to the touching element 7 as well as abutting on the second stop element 45.

With the approach described herein of a functionality for detecting a desired positioning of joining partners 15 to be welded inside an ultrasonic welding device 1, it is possible to achieve easier operability of the ultrasonic welding device 1, in particular for less practiced operators, while maintaining consistent quality of the weld. In particular, it may be detected whether a weld splice is in the correct position. As a result, it is possible to achieve constant quality in the weld splices produced. This may largely prevent the production of defective parts.

Finally, it should be noted that terms such as "having", "comprising", etc. do not exclude any other elements or steps and that terms such as "one" or "a" do not exclude a plurality. It should further be pointed out that features or steps which have been described with reference to one of the above exemplary embodiments may also be used in com-

LIST OF REFERENCE NUMERALS

1 Ultrasonic welding device
3 Sonotrode
5 Anvil
7 Touching element
9 Lateral slide
11 First stop element
13 Receiving chamber
15 Joining partner
17 First strand
19 Second strand
21 Surface of the sonotrode
23 Surface of the anvil
25 Surface of the touching element
27 Surface of the lateral slide
29 Drive device
31 Displacement direction of the first stop element
33 Displacement direction of the lateral slide
35 Control system
37 Surface of the first stop element
39 First electrode
41 Second electrode
43 Signal generating device
40 Second stop element
47 Segments
49 Segment-moving element
51 Springs
53 Surface of the second stop element
55 Third electrode

The invention claimed is:

1. An ultrasonic welding device for detecting a desired positioning of joining partners to be welded inside the ultrasonic welding device, comprising:
   a sonotrode;
   an anvil;
   a touching element;
   a lateral slide;
   a first stop element; and
   a receiving chamber in which joining partners are to be received and which is defined by bordering components of the ultrasonic welding device;
   wherein the receiving chamber is defined on a first side by a surface of the sonotrode and on a second side opposing the first side by a surface of the anvil;
   wherein the receiving chamber is further defined on a third side by a surface of the touching element and on a fourth side opposing the third side by a surface of the lateral slide;
   wherein the receiving chamber, at least in a positioning configuration which may be assumed by the first stop element, is further defined on a fifth side, extending transverse to the first to fourth sides, by a surface of the first stop element directed toward the receiving chamber;
   wherein the first stop element is electrically conductive on its surface directed toward the receiving chamber in order to form a first electrode;
   wherein at least one of the bordering components defining the receiving chamber, including the sonotrode, the anvil, the touching element and the lateral slide, is electrically conductive on its surface directed in each case toward the receiving chamber in order to form a second electrode;
   wherein the ultrasonic welding device is configured to detect an electrical closure between the first electrode and the second electrode and, based thereon, to detect the desired positioning of at least one joining partner to be welded.

2. The ultrasonic welding device according to claim 1, wherein an electrical insulation is arranged between the surface of the stop element directed toward the receiving chamber and the surface of the at least one of the bordering components defining the receiving chamber.

3. The ultrasonic welding device according to claim 1, wherein the surface forming the second electrode extends laterally adjacent to the receiving chamber.

4. The ultrasonic welding device according to claim 1, wherein the surface forming the second electrode extends vertically.

5. The ultrasonic welding device according to claim 1, wherein the touching element is arranged laterally adjacent to the receiving chamber and in the horizontal direction stationary with respect to the receiving chamber, and
   wherein the surface forming the second electrode is the surface of the touching element directed toward the receiving chamber.

6. The ultrasonic welding device according to claim 1, wherein the first stop element is displaceable between a pulled-in position and a pulled-out position;
   wherein in the pulled-in position the first stop element defines the receiving chamber on the fifth side and in the pulled-out position leaves the receiving chamber open on the fifth side.

7. Ultrasonic welding device according to claim 6,
   further comprising a drive device which is configured to actively displace the first stop element between the pulled-in position and the pulled-out position.

8. The ultrasonic welding device according to claim 1,
   further comprising a second stop element,
   wherein the receiving chamber, at least in a positioning configuration which may be assumed by the second stop element, is further defined on a sixth side, opposing the fifth side, by a surface of the second stop element directed toward the receiving chamber;
   wherein the second stop element is electrically conductive on its surface directed toward the receiving chamber in order to form a third electrode;
   wherein the ultrasonic welding device is configured to detect an electrical closure between the third electrode and the second electrode and, based thereon, to detect the desired positioning of at least one joining partner to be welded.

9. The ultrasonic welding device according to claim 8,
   wherein the second stop element is displaceable between a pulled-in position and a pulled-out position, wherein in the pulled-in position the second stop element defines the receiving chamber at least in certain areas on a sixth side and in the pulled-out position leaves the receiving chamber open on the sixth side.

10. The ultrasonic welding device according to claim 8,
    wherein the second stop element comprises a plurality of elongate segments, each extending in a direction along the sixth side and parallel to each other,
    wherein each of the segments is displaceable between the pulled-in position and the pulled-out position independently of adjacent segments.

11. The ultrasonic welding device according to claim 1, wherein the ultrasonic welding device is configured to emit a signal perceptible to an operator of the ultrasonic welding device on detecting an electrical closure between the first electrode and the second electrode.

12. The ultrasonic welding device according to claim 1, wherein the ultrasonic welding device is configured to enable execution of a welding operation exclusively on detecting an electrical closure between the first electrode and the second electrode.

13. The ultrasonic welding device according to claim 1, wherein the ultrasonic welding device is configured to automatically initiate execution of a welding operation on detecting an electrical closure between the first electrode and the second electrode.

* * * * *